HAYDN M. BAKER, OF NEW YORK, N. Y.

Letters Patent No. 84,404, dated November 24, 1868; antedated November 7, 1868.

IMPROVED PROCESS OF RECOVERING PIGMENTS, OILS, AND GUMS FROM CLOTHS USED BY ENGRAVERS.

The Schedule referred to in these Letters Patent and making part of the same.

*To all whom it may concern:*

Be it known that I, HAYDN M. BAKER, of the city, county, and State of New York, have invented a new and useful Process for the Manufacture or Recovery of Pigments, Gums, and Oils from Cloths Used by Bank-Note and other Engravers to wipe their plates; and I hereby declare that the following is a full and exact description thereof.

The nature of my invention consists in treating engravers' wiping-cloths with a substance or any substance capable of dissolving the oils and resinous or gummy portion of the ink, and forming a solution of same, thereby leaving the pigmentary portion of the ink in a mechanical state of combination with the cloths.

The application of pressure and agitation during the immersion in the solvent, disengages the coloring-matter, which falls to the bottom in an insoluble condition, (except in the case of the green ink, part of the coloring-matter being soluble.) When this action is complete, the cloths may be removed and pressed, and are ready for use again by the engravers.

If one now places the solution of oils, gums, and resins, together with the coloring-matter, in a distillatory apparatus, and submits the whole to distillation, the solvent passes to the condensers, and is recovered, while the printers' ink remains in the retort.

By another method, *i. e.*, removing the solution of oils, gums, and resins from precipitated coloring-matter, by filtration or decantation, and submitting said solution to distillation, the solvent is recovered, and the oils and gummy matters remain in the retort, and are serviceable as drying-oils, or what are conventionally termed "driers," while the coloring-matter may be preserved in an uncombined condition, and applied to any industrial purpose for which it is applicable.

One may also manufacture paints directly after this method, by immersing the cloths in a suitable solvent, and applying pressure to the same upon removing the cloths, and distilling or evaporating off a certain portion of the solvent, and mixing the residue with boiled or raw linseed-oil, to impart consistency, and then grinding. The product is paint.

There is a great variety of solvents, some of which act without the aid of heat, while others require it.

Those which I deem most practicable and useful, are coal-tar benzole, coal-tar naphtha, and coal-tar light oils. Next to these comes *Oleum terebinthæ*, (oil of turpentine,) but, if recovered by distillation, requires to have water in the retort with it, on account of the troublesome vapors resulting from the distillation of said compound, (oil of turpentine,) while, in the manufacture of paints, it makes a very useful menstruum or solvent.

After the above-named compounds, I regard æther (sulphuric) as being the next most useful agent in point of effectiveness.

Then follow linseed-oil, kerosoline, gasoline, (and the light oils resulting from the destructive distillation of coal and petroleum,) with the aid of elevated temperatures.

Very many essential and artificial oils possess solvent properties, but their use does not appear practicable.

In the manufacture of paints from the cloths before mentioned, considerable judgment and experience are required, as the inks contained therein are mechanical mixtures of metallic oxides, with resins, gums, and oils, and, if too great an excess of solvent be used, the coloring-matter will isolate itself and fall as a precipitate, on account of the high specific gravity of the metallic oxide.

It is, therefore, proper, for paint-purposes, to use heavy solvents, and use heavy oils to equalize the mixture.

The non-oxygenated oils may be separated from the resins and gums by distillation, but the gums and resins are apt to become carbonized unless one makes use of such baths as control the boiling-point of said oils in the process of distillation.

The advantages of this invention are, that it affords a cheap and economical process or method for the production of valuable paints from substances which have heretofore been wasted.

It furthermore provides a method for cleaning cloths used by engravers, which is effective and economical, and does not injure the fibre, and thereby permits the use of the same very many more times than occurs from the methods now practised.

Claims.

What I claim as my invention, and desire to secure by Letters Patent, is—

1. The manufactures of paints from the material contained in cloths or fibrous substances, (used by engravers for wiping their plates,) in the manner or by the process herein described.
2. Also, the use of the solvents herein enumerated, or their equivalents, for the purposes set forth in the specification, *i. e.*, the manufacture of paint.
3. Furthermore, the process, herein described, for the separation and recovery of oils, and gums, or resinous matter.

HAYDN M. BAKER.

Witnesses:
JOHN ADAMS,
GEO. DARLING.